Figure 1:
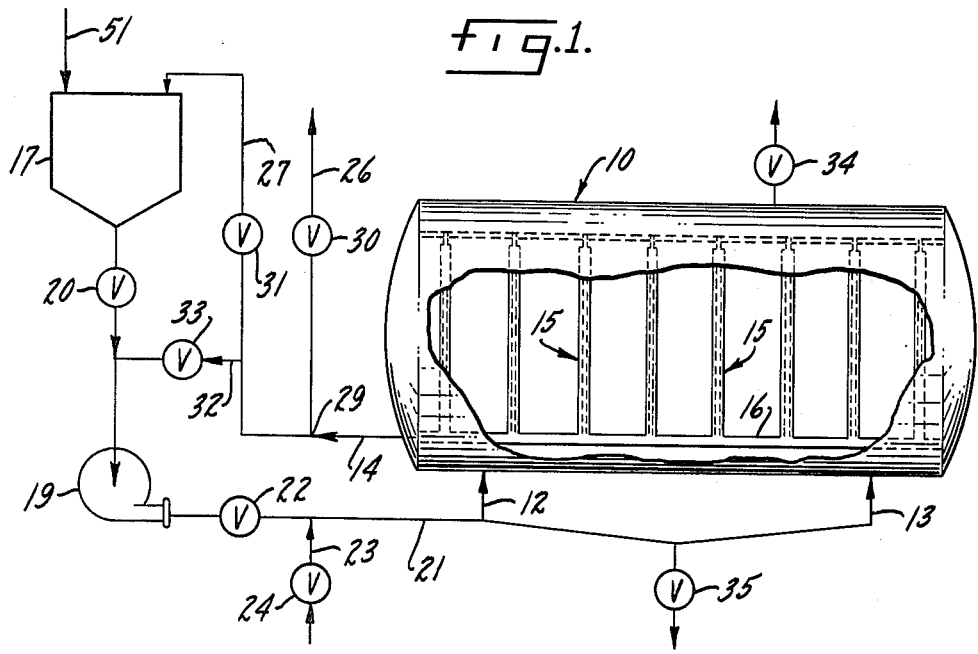

May 10, 1966 J. A. LEVENDUSKY 3,250,704
METHOD FOR REMOVING IMPURITIES FROM WATER STREAMS
Filed Nov. 12, 1963

INVENTOR.
Joseph A. Levendusky,
BY
Byron, Hume, Groen & Clement
Attorneys.

United States Patent Office 3,250,704
Patented May 10, 1966

3,250,704
METHOD FOR REMOVING IMPURITIES FROM WATER STREAMS
Joseph A. Levendusky, Bayonne, N.J., assignor to Union Tank Car Company, Chicago, Ill., a corporation of New Jersey
Filed Nov. 12, 1963, Ser. No. 323,177
18 Claims. (Cl. 210—24)

This invention relates to a method for removing impurities from water streams with a mixture of anion and cation exchange resin particles in the size range of about 60 to 400 mesh.

It has recently been discovered that improved removal of impurities from a fluid may be obtained by passing the fluid through a filter screen pre-coated with a layer of ion exchange resin particles in the size range of about 60 to 400 mesh, hereinafter referred to sometimes as "finely divided" resin particles. This method is disclosed and claimed in applicant's co-pending application Serial No. 263,999, filed March 8, 1963, which is a continuation-in-part of applicant's application Serial No. 133,670, filed October 24, 1961, now abandoned, these applications being assigned to the same assignee as the present application.

One of the problems encountered with this method of removing impurities was that the pre-coat layer of finely divided anion or finely divided cation exchange resin particles, even though generally less than two inches thick, created a larger than optimum pressure drop to the liquid passing therethrough. The pressure drop across the bed of resin particles in an impurity removal system should be kept low to avoid the necessity for large pumps, or low flow rates, or both.

It was recently discovered that the pressure drop across the pre-coat layer could be substantially reduced by utilizing as the pre-coat layer a mixture of finely divided anion and finely divided cation resin particles. It has been theorized that when the anion and cation finely divided resin particles are mixed they tend to agglomerate or "clump" with one another to form larger particles. Because of the formation of these larger particles, a greater void space is provided in a pre-coat layer of finely divided exchange resin particles whereby there is less resistance to the flow of liquid through the pre-coat layer. This theory is supported by the fact that the volume of a mixture of anion and cation finely divided resin particles in water is far greater than the volume of the resin particle mixture in the dry state. Furthermore, it has been visually observed that the mixture of resin particles form larger particles in water. Such a filter pre-coat and method is disclosed and claimed in applicant's co-pending application Serial No. 263,811, filed March 8, 1963, and assigned to the same assignee as this application.

However, such pre-coat layers of mixed anion and cation finely divided exchange resin particles create problems when they have a volume increase greater than 550% and, more particularly, when they have a volume increase greater than 600%, i.e., when the volume of the resin particle mixture in water is 550% or 600%, respectively, greater than the volume of the resin particle mixture in the dry state. When the volume increase or clumping of the resin particle mixture reaches this stage, it is difficult to pre-coat the mixture on the filter screen. The liquid flow rate through the filter must be substantially increased in order to pre-coat such a highly clumped mixture of finely divided resins on a filter screen. This requires larger, more expensive pumps and is therefore undesirable. Furthermore, a pre-coat layer with such a highly clumped mixture is not uniform in thickness, or density, or both. This causes channelling and poor flow distribution of the liquid passing through the pre-coat layer. Also, this reduces the quality of the effluent and requires filter screen cleaning or replacement. Therefore a method for controlling the clumping or volume increase of a mixture of anion and cation finely divided resin particles to obtain the benefits of a low pressure drop and high effluent quality without using high flow rates was needed.

Accordingly, an object of the present invention is to provide a method of controlling the volume increase of a mixture of anion and cation exchange resin particles in the size range of about 60 to 400 mesh.

A further object is to provide a method of controlling the volume increase of a filter pre-coat mixture of anion and cation exchange resin particles in the size range of about 60 to 400 mesh to prevent a volume increase greater than about 550% and, more particularly, to prevent a volume increase of greater than about 600%.

Still another object is to provide a method of removing impurities from water with a filter screen having a pre-coat layer of a mixture of anion and cation exchange resin particles in the size range of about 60 to 400 mesh.

Another object is to provide a method of pre-coating a filter screen with a water slurry of a mixture of anion and cation exchange resin particles in the size range of about 60 to 400 mesh.

These and other objects more apparent hereinafter are realized by the method of the present invention by adding a predetermined amount of a water-soluble resinous polyelectrolyte to a water slurry with a mixture of anion and cation finely divided exchange resin particles whereby the volume increase of the resin particle mixture is below about 600% and, more preferably, below about 550%. The amount of water-soluble resinous polyelectrolyte added to the slurry permits the resin particle mixture to have a volume increase of at least about 100% and, more preferably, at least about 300%.

Figure 2:
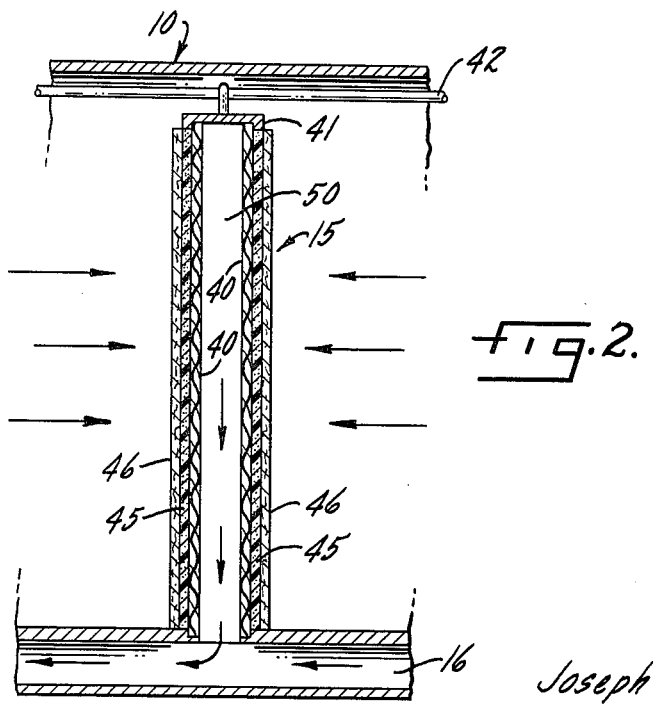

The invention, both as to its organization and method of operation, taken with further objects and advantages thereof, will best be understood by reference to the following description taken in conjunction with the accompanying drawings, in which:

FIGURE 1 is a schematic representation of a filtering system embodying the features of the present invention, the filter tank of the system being partially cut away to illustrate the filters in the filter tank; and FIGURE 2 is an enlarged cross-sectional view of one of the filters illustrated in FIGURE 1, illustrating the filter screen, the pre-coat layer, and a filter cake.

Referring to the drawings, and more particularly to FIGURE 1, there is illustrated schematically a filter system for removing dissolved and undissolved impurities from water in accordance with the present invention. The present invention will be discussed in detail with respect to the purification of a steam condensate water in a steam generating system of an electrical power plant, though the present invention has application to the purification of any water stream for industrial, domestic and potable uses, such as removing impurities from a waste water from laundry equipment, a tap water, water from rivers, lakes and streams, and the like.

The filter system is of the type disclosed in detail in applicant's above-mentioned co-pending application Serial No. 263,999 and includes a filter tank, indicated generally by reference numeral 10, having inlet lines 12 and 13 and an outlet line 14. Mounted within the filter tank 10 are a plurality of filters, indicated generally by reference numerals 15. The filters 15 are connected to an outlet header 16 which in turn is connected to the outlet line 14. The condensate to be treated passes into the filter tank 10 via lines 12 and 13 and through the filters 15, is collected in the outlet header 16 and leaves the filter tank 10 through the outlet line 14.

A water slurry of the particular pre-coat medium, a mixture of anion and cation, finely divided ion exchange resin particles in the size range of about 60 to 400 mesh, is prepared in accordance with the method of the present invention and stored in a pre-coat tank 17. A slurry line 18, controlled by a slurry valve 20, connects the pre-coat tank 17 with a slurry pump 19. A transfer line 21 connects the pump 19 with the inlet lines 12 and 13 of the filter tank 10. A transfer valve 22 adjacent the pump 19 and in the transfer line 21 controls the passage of slurry or liquid from the pump 19.

The condensate water to be treated enters the filter system through feed line 23 having an intake control valve 24. The feed line 23 is connected to the transfer line 21 between the control transfer valve 22 and the inlet line 12.

The outlet line 14 from the filter tank 10 is connected to a service line 26 and a pre-coat return line 27 at a T-juncture indicated by reference numeral 29. The service line 26 is connected to service units not shown, such as a steam generator and the like, and has a service valve 30. The pre-coat return line 27 is connected to the pre-coat tank 17 and has a return valve 31 to control the flow of slurry back to the pre-coat tank 17.

A bridge line 32 with a bridge valve 33 interconnects the pre-coat return line 27 and the slurry line 18. The filter tank 10 is equipped with a vent valve 34 and a drain valve 35.

Referring to FIGURE 2, each filter 15 comprises two spaced filter screens 40 held at their upper edges by a bracket 41 which is attached to a longitudinally extending brace 42 suitably mounted in the filter tank 10. A peripheral seal (not shown) closes the outer edges of the filter screens 40 to form a chamber 50 therebetween which directly communicates with the outlet header 16. Thus, water entering the filter tank 10 must pass through the filter screens 40 into the chamber 50 and is withdrawn from the filter tank 10 through the outlet header 16. The flow of the water through the filter tank 10 is represented by the arrows in FIGURE 2.

During the pre-coating step a pre-coat layer 45 of a mixture of finely divided anion and cation exchange resin particles in the size range of about 60 to 400 mesh is deposited upon the upstream sides of the filter screens 40, i.e., the sides where the condensate water is introduced into the filter screens 40. Similarly, during the filtering step a filter cake 46 builds up within and on the upstream side of the pre-coat layer 45.

In preparing the filter system for operation the initial step is to pre-coat the filter screen 40. To these ends, the filter tank 10 is filled with a low impurity water, such as demineralized water. A slurry of pre-coat medium and demineralized water is prepared in the pre-coat tank 17, the pre-coat medium being a mixture of anion and cation exchange resin particles in the size range of about 60 to 400 mesh. It is preferable to employ ion exchange particles in the size range of about 100 to 400 mesh, the most preferred range being 200 to 400 mesh. It is further preferred that a major portion of the ion exchange resin particles comprise, on a weight basis, particles in the size range of 100 to 400 mesh, most preferably 200 to 400 mesh.

In this instance, the pre-coat medium comprises a mixture of finely divided anion and cation exchange resin particles wherein the mixture comprises about 50% by weight of cation resin particles. The finely divided resin particles are in the size range of 100 to 400 mesh, a major portion of the finely divided resin particles, on a weight basis, being in the size range of 200 to 400 mesh. The finely divided resins are of the divinylbenzene-styrene copolymer type, the anion resin particles being strongly basic and in the hydroxide form and the cation resin particles being strongly acidic and in the ammonium form. As is evident from Example VI of applicant's above-mentioned co-pending application Serial No. 263,- 811, such a mixture of finely divided resin particles will have a volume increase of about 650%. However, in accordance with the present invention a water-soluble resinous polyelectrolyte is added to the slurry in the pre-coat tank 17 through a line 51 to reduce the volume increase of the resin particle mixture to an amount less than 600%, preferably less than 550%, but to allow at least about 100% volume increase, preferably a volume increase of at least about 300%.

During the pre-coating step all the valves are closed, except the slurry valve 20, the transfer valve 22 and the return valve 31. The pre-coating step is initiated by starting the pump 19, thereby drawing the resin pre-coat slurry from the pre-coat tank 17 and through the slurry line 18 to the pump 19. The slurry is forced by the pump 19 through the transfer line 21 and the inlet lines 12 and 13 into the filter tank. The pressure of the incoming slurry forces the demineralized water in the filter tank 10 through the filters 15 and the chamber 50 and out of the filter tank 10 via the outlet header 16 and the outlet line 14. This demineralized water enters the pre-coat tank 17 through the return line 27.

As the cycling continues the pre-coat slurry is brought into contact with the upstream surfaces of the filter screens 40 of the filters 15. The mixture of anion and cation exchange resin particles of the pre-coat medium are separated from the slurry and deposited as the pre-coat layer 45 upon the upstream surfaces of the screens 40. Because of the fine size of the ion exchange resin particles in the pre-coat medium, a small pressure differential across the filter screens 40 suffices to maintain the resin pre-coat layer 45 in place. The slurry is circulated through the filter system in this manner until a sufficient depth of the resin pre-coat layer 45 is deposited upon the upstream surface of the filter screens 40. The apertures of the filter screens 40 must, of course, be small enough to cause the finely divided resin particles to deposit upon the upstream side and form the pre-coat layer 45.

The thickness of the pre-coat layer 45 may be greater than a few inches, but it is preferred that the layer 45 have a thickness in the range of about $1/16$ to 2 inches, more preferably about $1/8$ to 1 inch, and most preferably $1/8$ to $5/8$ inch.

The pre-coating step is terminated by closing the valve 20 and the return valve 31 and opening the bridge valve 33. The pump 19 is kept running until the recycle stream is clear. The filter system is now ready to be used to treat the feed water.

The service run is begun by closing the bridge valve 33 and the transfer valve 22 and opening the service valve 30 and the feed valve 24. This step is preferably timed to maintain sufficient pressure in the system to assure retention of the pre-coat layer 45 on the filter screens 40. In this manner, untreated condensate water enters the filter system through the feed line 23 and passes through the transfer line 21 and the inlet lines 12 and 13 into the filter tank 10. The pressure of the incoming untreated water forces it through the resin pre-coat layer 45, the filter screen 40, the chamber 50 and the outlet header 16.

As the untreated water passes through the pre-coat layer 45, an ion exchange reaction takes place to remove dissolved impurities from the water. In addition, undissolved impurities are removed from the untreated water by virtue of the water passing through the filter screens 40 and the pre-coat layer 45 of anion and cation finely divided exchange resin particles. Filter cake 46, consisting of the undissolved impurities, builds up within and on the pre-coat layer 45 as the process continues. The purified or treated water flows from the chamber 50 through the outlet header 16 and the outlet line 14 to the service line 26. The purified water is directed to a supply tank or suitable equipment by the service line 26.

Eventually the resins will become exhausted and must be regenerated or discarded. At this time the filtering step is stopped by closing the intake valve 24 and the service valve 30. The vent valve 34 and the drain valve 35 are opened to drain the filter tank 10. The finely divided ion exchange resin particles are recovered from the drain water and regenerated. The filters 15 are washed by an internal washing system not described or shown and not forming a part of the present invention. Another charge of mixed anion and cation exchange resin particles in the size range of about 60 to 400 mesh is then placed in the pre-coat tank 17 and the process of slurrying, pre-coating, and filtering described in detail hereinbefore is repeated. Preferably several charges of resin particles are available to decrease down time and allow re-starting the process while the exhausted resins are being separately regenerated.

In this manner, an impurity-bearing condensate water is treated to remove insoluble and soluble impurities. For example, soluble silicas, chloride compounds, compounds of calcium and magnesium, such as the sulfates and bicarbonates, and the like, may be removed from a water stream by a filter screen having a pre-coat comprising a mixture of finely divided anion and cation exchange resin particles. Also, substantial removal of undissolved impurities, such as colloidal silica, iron and copper, may be achieved.

Excessive clumping is a problem with mixtures of anion and cation exchange resin particles when the cation resin particles are of the strong acid, divinylbenzene-styrene copolymer type, the weak acid, acrylic type, or mixtures thereof, and in the hydrogen form, ammonium form, or mixtures thereof, and the anion resin particles are of the strong base, divinylbenzene-styrene copolymer type and in the chloride form, hydroxide form, or mixtures thereof. As is well known in the art, "strong base" anion exchange resin particles refers to anion exchange resin particles having quaternary ammonium as the principal function group. "Strong acid" cation exchange resin particles refers to cation exchange resin particles having nuclear sulfonic, or methylene sulfonic, or both, as the principal functional groups. "Weak acid" cation exchange resin particles refers to cation exchange resin particles having carboxylic acid, or phenolic hydroxyl, or both, as the principal functional groups. The proportion by weight percent of the cation exchange resin particles in the resin particle mixture which causes excessive volume increase will be dependent upon many factors, such as the type of exchange resin particles, the form of the resin particles, the concentration and nature of electrolytes in the water stream, the capacity and degree of regeneration of the resin particles and the size of the resin particles. In general, however, excessive volume increase or clumping may occur where the percent by weight of cation exchange resin particles in the resin particle mixture is in the range of about 10 to 90%, and more often in the range of about 25 to 75%. However, whenever the factors are such that the volume increase of the resin particle mixture is greater than about 600%, the method of the present invention should be utilized to reduce the volume increase to below about 600%, and preferably below about 550%, and to allow the resin particle mixture to have a volume increase of at least about 100%, preferably a volume increase of at least about 300%, and most preferably a volume increase of at least about about 450%.

Water-soluble resinous polyelectrolytes, such as polyacrylic acids, polymethacrylic acid, polymeric maleic acid, polymeric vinylbenzyltrimethylammonium chloride, polymeric vinylbenzyldimethylethanolammonium chloride, the water-soluble polyamine resinous types and the like, may be employed in the method of the present invention. The amount of water-soluble resinous polyelectrolyte added to the water containing the resin particle mixture is in the range of about 0.05 to 1% by weight of the dry resin particle mixture, preferably about 0.1% by weight of the dry resin particle mixture.

The filter screens shown in the drawings represent only one possible embodiment in that the filter screens 40 may be annular, conical or other shapes without departing from the spirit of the present invention. Furthermore, though in this embodiment a pre-coat slurry was independently circulated to pre-coat the filter screens 40 in advance of the introduction of feed water, the finely divided resin particles may be mixed directly into the feed water at the start of the run with similar results, so long as the water-soluble resinous polyelectrolyte is added to the feed water in the desired amount. In addition, after a precoat layer has been formed, additional mixed finely divided resin particles may be added to the feed water prior to the feed water passing through the pre-coat layer and filter screen, it being only necessary that sufficient water-soluble resinous polyelectrolyte be added to prevent excessive volume increase of the additional resin particles added to the system.

Some of the advantages of the present invention will be seen from the following examples:

*Example 1*

The purification system employed for this series of tests was generally similar to the system illustrated in FIGURE 1, but on a reduced scale. The system comprised a Lucite filter tank having a single cotton-wound annular filter screen having a filter surface area of 0.44 sq. ft. The system included a pre-coat tank, a pump, a slurry line interconnecting the pre-coat tank with the pump, a transfer line interconnecting the pump with an inlet line into the filter tank, and an outlet line from the filter tank which was connected with a pre-coat return line which, in turn, leads back to the pre-coat tank. A feed line for the water to be treated was connected to the transfer line and a service line was connected to the outlet line. A bridge line interconnected the pre-coat return line with the slurry line. All lines had suitable valves.

In one test, 20 grams (dry weight) of hydrogen-form, strong acid, divinylbenzene-styrene copolymer-type cation exchange resin particles in the size range of about 100 to 400 mesh were mixed with 20 grams (dry weight) of hydroxide-form, strong base, divinylbenzene-styrene copolymer-type anion exchange resin particles in the size range of about 100 to 400 mesh in one liter of demineralized water in the pre-coat tank to form a homogenous slurry. It was visually observed that the mixture of resin particles had agglomerated into balls having a diameter of ½ to ¾ inch. The mixture of resin particles had a volume increase of about 750 to 770%. This was determined by placing a measured portion of the homogenous slurry in a 250 ml. graduated cylinder and allowing the resin particle mixture of the slurry sample to settle therein for five minutes. The volume of the resin particle mixture after settling was then measured and compared with the volume of this amount of the resin particle mixture in the dry state to determine the volume increase of the resin particle mixture. The sample was then returned to the pre-coat tank. The slurry was then pumped through the filter tank at a rate of 4 g.p.m./sq. ft. of filter surface area to pre-coat the filter screen with the resin particle mixture. After the slurry had been pumped through the filter screen and no longer contained resin particles, it was visually observed that a non-uniform layer of resin particle mixture had been formed on the filter screen. The thickness of the non-uniform layer varied from nil to about ¾ inch.

Raw New York city tap water blended with demineralized water was used as the feed water. The feed water had a conductivity in the range of about 2 to 4 mmhos., the conductivity being a measure of the dissolved solids content of the feed water. During the treating cycle the initial pressure drop across the pre-coat layer and the filter screen was about 4.7 p.s.i.a. The effluent had a conductivity of about 0.4 mmho. The percent of the ion exchange capacity of the resin particle mixture which was utilized in this test, based upon a fixed predetermined ion exchange capacity rating of the resin particle mixture, was 60 to 70%.

This same test was repeated in a plurality of runs using the same purification system, source of blended feed water, flow rates, type, form and amount of resins, etc. However, polyacrylic acid was added to the pre-coat tank in preparing the resin particle mixture slurry. In each of these runs it was visually observed that a uniform pre-coat layer of resin particle mixture of about 3/16 inch was formed on the entire filter screen. The amount of polyacrylic acid added in each of these runs and the results of these runs are shown in Table A below:

TABLE A

| Amt. of Polyacrylic Acid, Percent by Weight of Dry Resin Particles | Percent Volume Increase | Initial Pressure Drop, p.s.i.a. | Conductivity of Effluent, mmhos. | Ion Exchange, Percent Capacity Utilized |
|---|---|---|---|---|
| 0.05 | 550–600 | 4.7 | 0.12 | 105–110 |
| 0.1 | 550 | 4.7 | 0.13 | 105–110 |
| 0.2 | 450 | 5 | 0.15 | |
| 0.3 | 450 | 6.8 | 0.13 | |
| 0.4 | 400 | 7.8 | 0.16 | |
| 0.5 | 250–300 | 8.1 | 0.21 | |
| 1.0 | 150–200 | 12.8 | 0.12 | 105–110 |

It is evident that the addition of polyacrylic acid to the water slurry prior to pre-coating the resin particle mixture on the filter screen controls the volume increase of the resin particles so as to improve the quality of the effluent. Furthermore, the low conductivity of the effluent and the volume increase of the resin particle mixture indicates that the polyacrylic acid does not appear in the effluent when used in amounts in the range of about 0.05 to 1% by weight based on the dry weight of the resin particle mixture.

*Example II*

A commercial purification system in a steam generating unit of an electrical power plant was utilized in this test. The purification system was substantially the same as the system illustrated in FIGURE 1 in that it comprised a filter tank equipped with suitable vents and drains, a pre-coat tank, a pump, a slurry line interconnecting the pre-coat tank with the pump, a transfer line interconnecting the pump with inlet lines into the filter tank, and an outlet line from the filter tank which was connected with a pre-coat return line which, in turn, leads back to the pre-coat tank. A feed line for untreated water was connected to the transfer line and a service line was connected to the outlet line. In addition, a bridge line interconnected the pre-coat return line with the slurry line. All lines had suitable valves.

Several annular cotton-wound filter screens having a total filter surface area of about 150 sq. ft. were in the filter tank.

In the first test, hydrogen-form, strong acid, divinylbenzene-styrene copolymer-type cation exchange resin particles in the size range of about 100 to 400 mesh were mixed with hydroxide-form, strong base, divinylbenzene-styrene copolymer-type anion exchange resin particles in the size range of about 100 to 400 mesh. The finely divided cation exchange resin particles constituted about 50% by weight of the total resin particle mixture. The amount of resin particle mixture was 0.15 lb. per square foot of filter surface area. The resin particle mixture was slurried in the feed water. The feed water was steam condensate water containing ammonia impurities of about 200 p.p.b. and morpholine impurities of about 300 p.p.b. The condensate water contained dissolved and undissolved impurities of iron, copper and silica in the range of about 5 to 15 p.p.b. total.

The resin particle mixture in the pre-coat tank was tested in the same manner discussed in Example I and found to have a volume increase of about 800%, it being visually observed that the resin particles had agglomerated into balls having a diameter of about 3/4 to 1 inch. The filter screen was pre-coated in the manner described with reference to FIGURE 1 and more condensate water fed through the filter at a flow rate of about 4 g.p.m./sq. ft. of filter screen area until the pressure drop across the filters, including the pre-coat layers, was about 25 p.s.i.a. After the run had been completed, the filter was opened after being drained through the outlet line and a visual inspection made of the filter screens. It was found that the filter screens were non-uniformly coated with the resin particle mixture. The filter screen was bare of resin particles in some locales while in others there was bridging of the resin particles between filter screen elements. The thickness of the pre-coat layer varied from nil to more than two inches and was even greater where bridging had occurred. The initial pressure drop across the pre-coat layer and filter screens was about 5 p.s.i.a.

Another test was made in the same system utilizing the same type, form and amount of resin particles, flow rates, etc. The same source of condensate water was used for feed and slurry water. In this case, polyacrylic acid was added to the resin particle mixture slurry in an amount equal to 0.2% by weight of dry resin particle mixture. The resin particles in the slurry were visually observed to form balls having a diameter of about 1/4 inch. The volume increase of the resin particle mixture was about 500%. Again, condensate water was passed through the filter system, after it had been pre-coated, until the pressure drop was about 25 p.s.i.a. The initial pressure drop was about 5 p.s.i.a. After the condensate run had been completed, the filter was again opened after being drained through the outlet line and it was visually observed that all of the filter screens were uniformly coated with the resin particles. The uniform pre-coat layer had a thickness of about 1/4 inch. The quality of the effluent in both tests was substantially the same.

This comparative test shows that the method of the present invention assures uniform pre-coating of the filter screen. A uniform pre-coating of the filter screen is extremely important as the pre-coat layer must protect the filter screen from direct contact with the solid impurities in the feed water. When there are bare spots on the filter screen solid impurities accumulate directly on the filter screen; this requires that the filter screen be cleaned or replaced as compared with merely removing and replacing the pre-coat layer. Accordingly, the method of the present invention reduces costs and lengthens the lift of the filter screen.

The term "filter screen" as used in this application is intended to embrace all mechanical filtering means, such as a filter screen, filter cloth, filter leaf, or the like. As is well known in the art, such mechanical filter means may be made of wire, cloth, natural or synthetic fiber-wound elements, such as cotton-wound or nylon-wound elements, paper and the like.

While the embodiments described herein are considered at present to be preferred, it will be understood that various modifications and improvements may be made therein and it is intended to cover in the appended claims all such modifications and improvements as wall within the true spirit and scope of the invention.

What is claimed is:

1. A method of controlling the volume increase in water of a filter pre-coat mixture of anion and cation exchange resin particles in the size range of about 60 to 400 mesh and normally having a volume increase in said water of greater than 550% as compared to the volume of said mixture in a dry state, comprising adding to said mixture while in water a water-soluble resinous polyelectrolyte in sufficient amount to prevent the volume increase of said resin particle mixture from exceeding about 550% while allowing said resin particle mixture to have a volume increase of at least about 100%, said water-soluble resinous polyelectrolyte being selected from the group consisting of polyacrylic acids, polymethacrylic acid, polymeric maleic acid, polymeric vinylbenzyltrimethyl-ammonium chloride, polymeric vinylbenzyldimethyl-ethanol-ammonium chloride and polyamine resinous types.

2. The method of claim 1 wherein said water-soluble resinous polyelectrolyte is added to said resin particle mixture in an amount in the range of about 0.05 to 1% by weight of said resin particle mixture.

3. The method of claim 1 wherein said anion exchange resin particles are strongly basic, divinylbenzene-styrene-type having a form selected from the group consisting of chloride, hydroxide, and mixtures thereof, said cation exchange resin particles are selected from the type consisting of strong acid divinylbenzene-styrene, weak acid acrylic, and mixtures thereof, and have a form selected from the group consisting of hydrogen, ammonium, and mixtures thereof.

4. A method of uniformly pre-coating a filter screen with a mixture of anion and cation exchange resin particles in the size range of about 60 to 400 mesh, said method comprising mixing said resin particles in water to form a slurry, adding to said slurry a water-soluble resinous polyelectrolyte in sufficient amount to prevent said resin particle mixture from having a volume increase greater than 550% while permitting said resin particle mixture to have a volume increase of at least 100%, and passing said slurry through said filter screen so as to deposit said resin particle mixture on said filter screen, said water-soluble resinous polyelectrolyte being selected from the group consisting of polyacrylic acids, polymethacrylic acid, polymeric maleic acid, polymeric vinylbenzyltrimethyl-ammonium chloride, polymeric vinylbenzyldimethyl-ethanol-ammonium chloride and polyamine resinous types.

5. The method of claim 4 wherein said anion exchange resin particles are strongly basic, divinylbenzene-styrene-type having a form selected from the group consisting of chloride, hydroxide, and mixtures thereof, and said cation exchange resin particles are selected from the type consisting of strong acid divinylbenzene-styrene, weak acid acrylic, and mixtures thereof, and have a form selected from the group consisting of hydrogen, ammonium, and mixtures thereof.

6. The method of claim 5 wherein said polyelectrolyte is added to said slurry in an amount in the range of about 0.05 to 1% by weight of said resin particle mixture on a dry basis.

7. A method of controlling the volume increase in water of a filter pre-coat mixture of anion and cation exchange resin particles in the size range of about 60 to 400 mesh and normally having a volume increase in said water of greater than 600% as compared to the volume of said mixture in a dry state, comprising adding to said mixture while in water a water-soluble resinous polyelectrolyte in sufficient amount to prevent the volume increase of said resin particle mixture from exceeding about 600% while allowing said resin particle mixture to have a volume increase of at least about 100%, said water-soluble resinous polyelectrolyte being selected from the group consisting of polyacrylic acids, polymethacrylic acid, polymeric maleic acid, polymeric vinylbenzyltrimethyl-ammonium chloride, polymeric vinylbenzyldimethyl-ethanol-ammonium chloride and polyamine resinous types.

8. The method of claim 7 wherein said water-soluble resinous polyelectrolyte is added to said resin particle mixture in an amount in the range of about 0.05 to 1% by weight of said resin particle mixture.

9. The method of claim 7 wherein said anion exchange resin particles are strongly basic, divinylbenzene-styrene-type having a form selected from the group consisting of chloride, hydroxide, and mixtures thereof, and said cation exchange resin particles are selected from the type consisting of strong acid divinylbenzene-styrene, weak acid acrylic, and mixtures thereof, and have a form selected from the group consisting of hydrogen, ammonium, and mixtures thereof.

10. A method of uniformly pre-coating a filter screen with a mixture of anion and cation exchange resin particles in the size range of about 60 to 400 mesh comprising mixing said resin particles in water to form a slurry, adding to said slurry a water-soluble resinous polyelectrolyte in sufficient amount to prevent said resin particle mixture from having a volume increase greater than 600% while permitting said resin particle mixture to have a volume increase of at least 100%, and passing said slurry through said filter screen so as to deposit said resin particle mixture on said filter screen, said water-soluble resinous polyelectrolyte being selected from the group consisting of polyacrylic acids, polymethacrylic acid, polymeric maleic acid, polymeric vinylbenzyltrimethyl-ammonium chloride, polymeric vinylbenzyldimethyl-ethanol-ammonium chloride and polyamine resinous types.

11. The method of claim 10 wherein said anion exchange resin particles are strongly basic, divinlybenzene-styrene-type having a form selected from the group consisting of chloride, hydroxide, and mixtures thereof, and said cation exchange resin particles are selected from the type consisting of strong acid divinylbenzene-styrene, weak acid acrylic, and mixtures thereof, and have a form selected from the group consisting of hydrogen, ammonium, and mixtures thereof.

12. The method of claim 11 wherein said polyelectrolyte is added to said slurry in an amount in the range of about 0.05 to 1% by weight of said resin particle mixture on a dry basis.

13. The method of removing impurities from steam condensate water which comprises forming a condensate water slurry of a mixture of anion and cation exchange resin particles in size range of about 60 to 400 mesh, said mixture of anion and cation exchange resin particles normally having a volume increase greater than about 550% in said condensate water, adding to said slurry a water-soluble resinous polyelectrolyte in sufficient amount to prevent said volume increase from exceeding about 550% while allowing said resin particle mixture to have a volume increase greater than about 100%, pre-coating a filter screen with said resin particle mixture by circulating said slurry through said filter screen, and passing condensate water to be treated through said pre-coated resin particle mixture and said filter screen, said water-soluble resinous polyelectrolyte being selected from the group consisting of polyacrylic acids, polymethacrylic acid, polymeric maleic acid, polymeric vinyl-benzyltrimethyl-ammonium chloride, polymeric vinylbenzyldimethyl-ethanol-ammonium chloride and polyamine resinous types.

14. The method of claim 13 wherein said anion exchange resin particles are strongly basic, divinylbenzene-styrene-type having a form selected from the group consisting of chloride, hydroxide, and mixtures thereof, and said cation exchange resin particles are selected from the type consisting of strong acid divinylbenzene-styrene, weak acid acrylic, and mixtures thereof, and have a form selected from the group consisting of hydrogen, ammonium, and mixtures thereof.

15. The method of claim 14 wherein said water-soluble resinous polyelectrolyte is added to said slurry in an amount in the range of about 0.05 to 1% by weight of said resin particle mixture.

16. The method of removing impurities from steam condensate water which comprises forming a condensate water slurry of a mixture of anion and cation exchange resin particles in size range of about 60 to 400 mesh, said mixture of anion and cation exchange resin particles normally having a volume increase greater than about 600% in said condensate water, adding to said slurry a water-soluble resinous polyelectrolyte in sufficient amount to prevent said volume increase from exceeding about 600% while allowing said resin particle mixture to have a volume increase greater than about 100%, pre-coating a filter screen with said resin particle mixture by circulating said slurry through said filter screen, and passing condensate water to be treated through said pre-coated resin particle mixture and said filter screen, said water-soluble resinous polyelectrolyte being selected from the group consisting of polyacrylic acids, polymethacrylic acid, polymeric maleic acid, polymeric vinylbenzyltrimethyl-ammonium chloride, polymeric vinylbenzyldimethyl-ethanol-ammonium chloride and polyamine resinous types.

17. The method of claim 16 wherein said anion exchange resin particles are strongly basic, divinylbenzene-styrene-type having a form selected from the group consisting of chloride, hydroxide, and mixtures thereof, and said cation exchange resin particles are selected from the type consisting of strong acid divinylbenzene-styrene, weak acid acrylic, and mixtures thereof, and have a form selected from the group consisting of hydrogen, ammonium, and mixtures thereof.

18. The method of claim 17 wherein said water-soluble resinous polyelectrolyte is added to said slurry in an amount in the range of about 0.05 to 1% by weight of said resin particle mixture.

References Cited by the Examiner

UNITED STATES PATENTS

| | | | |
|---|---|---|---|
| 2,625,529 | 1/1953 | Hedrick et al. | 210—54 |
| 2,855,371 | 10/1958 | Abrams | 260—2.1 |
| 2,961,417 | 11/1960 | Small | 260—874 |

MORRIS O. WOLK, *Primary Examiner.*

EDWARD G. WHITBY, *Assistant Examiner.*